(12) United States Patent
Linn (10) Patent No.: US 6,513,459 B2
(45) Date of Patent: Feb. 4, 2003

(54) LIVESTOCK CHUTE

(76) Inventor: Gene H. Linn, 472 County Rd. #401, Holland, TX (US) 76534

( * ) Notice: Subject to any disclaimer, the term of this patent is extended or adjusted under 35 U.S.C. 154(b) by 0 days.

(21) Appl. No.: 09/871,306

(22) Filed: Jun. 1, 2001

(65) Prior Publication Data

US 2002/0179022 A1 Dec. 5, 2002

(51) Int. Cl.[7] .............................................. A01K 15/04
(52) U.S. Cl. ....................... 119/729; 119/732; 119/736; 119/751
(58) Field of Search ......................... 119/729, 731–737, 119/741, 751, 752, 754, 756, 843; D30/113, 151

(56) References Cited

U.S. PATENT DOCUMENTS

| | | | | |
|---|---|---|---|---|
| 408,257 A | * | 8/1889 | Pattee | 119/729 |
| 2,576,654 A | * | 11/1951 | Thorson | 119/733 |
| 2,650,567 A | * | 9/1953 | Whitworth | 119/733 |
| 3,030,921 A | * | 4/1962 | Sanderson | 119/736 |
| 3,037,482 A | * | 6/1962 | Jackson et al. | 119/732 |
| 3,092,871 A | * | 6/1963 | Marshall et al. | 119/665 |
| 4,027,629 A | * | 6/1977 | Pearson | 119/732 |
| 4,162,685 A | * | 7/1979 | Knappenberger | 119/723 |
| 4,513,691 A | * | 4/1985 | Wood | 119/734 |
| 5,111,773 A | * | 5/1992 | Akins | 119/523 |
| 5,331,923 A | * | 7/1994 | Mollhagen | 119/729 |
| 6,199,514 B1 | * | 3/2001 | Jubinville et al. | 119/728 |

* cited by examiner

Primary Examiner—Charles T. Jordan
Assistant Examiner—Tara M Golba
(74) Attorney, Agent, or Firm—Bill B. Berryhill (57) ABSTRACT

A livestock chute for confining and controlling an animal including a pair of spaced apart side frames connected by support members to provide an elongated space into which the animal may be driven, a tailgate near the rear end of said space and a head gate assembly supported near a front end of the space which includes an expandable and contractible opening which, when expanded, allows the head of the animal to extend therethrough and, when contracted, surrounds the neck of the animal to prevent removal of said animal's head therefrom. A gate carriage is mounted near the top of the side frame for longitudinal movement relative thereto and from which the head gate assembly is suspended for movement between a terminal position near the front of the space and selected positions nearer the rear of said space. Preferred embodiments include a squeeze assembly for engagement with the hip area of the animal.

41 Claims, 4 Drawing Sheets

LIVESTOCK CHUTE

BACKGROUND OF THE INVENTION

1. Field of the Invention

The present invention pertains to livestock chutes. More specifically, the present invention pertains to chutes primarily for confining and controlling cattle for various treatments thereof, e.g. examination, medical treatment, branding, palpation, surgery, etc.

2. Description of the Prior Art

Livestock chutes for confining and controlling animals, specifically cattle, have been in use for many years. A typical chute is long and narrow providing an elongated space into which one animal at a time may be driven. The chute is usually provided with an entry or tailgate which is opened as the animal is driven into the chute. Once the animal is driven into the chute, the tailgate is closed preventing the animal from backing out of the space.

Typically, the chute is provided, near the front end of the elongated space, with a "head gate". There are basically three head gate designs, commonly referred to as: (1) saloon door; (2) guillotine and (3) scissor types. The purpose of the head gate is to provide an opening for the animal's head to pass through, thereby allowing the body of the animal (which is stronger, more muscular, less fragile) to be "squeezed" and immobilized; and also to secure the animal's head for any veterinary or ranching practices that may need to be performed on the head (i.e. ear tagging, ear notching, dehorning, doctoring the eyes, etc.). With livestock chutes that are currently on the market, the latter is usually accomplished with additional attachments that are added to the head gate unit.

Regardless of the type, the head gate provides an opening which allows the head of an animal to extend therethrough and is then positional to closely surround the neck of the animal, preventing removal of the animal's head therefrom. However, animals driven into a livestock chute do not normally want to move forward and place their heads in a head gate, even when confined in the chute. In fact, they usually back against the tailgate at the rear of the chute. For this reason, they must be driven forward. This is accomplished by forcing or prodding the animal forward, frequently with an electric prod, commonly referred to as a "hot shot". In the livestock chutes of the prior art, two persons are usually required to secure and immobilize the animal. One person is required at the rear of the animal to prod it forward and the other at the front of the chute to lock the animal's head in the head gate, regardless of the type of head gate being used, when the animal lunges forward. Animals so handled are often bruised and may even be seriously injured in this somewhat harsh and violent procedure. Examples of such cattle or livestock chutes of the prior art may be seen in U.S. Pat. Nos. 2,995,111; 2,786,449; 4,027,629 and 4,048,961.

In addition, some of the livestock chutes of the prior art are also provided with structure by which an animal, once its head is locked or secured by the head gate, is squeezed or wedged between opposing panels or frames to further immobilize the animal while being treated. In chutes of the prior art, such as those shown in the aforementioned U.S. Pat. Nos. 2,995,111; 4,027,629 and 4,048,961, the entire body of the animal is squeezed or wedged between the squeeze frames or panels. This requires movement of heavy and lengthy panels and in some cases does not provide easy access to sides of the animal.

Although a number of livestock chutes are commercially available, most of them do not allow one man operation or the flexibility of the various treatments required in ranching and veterinary procedures. Furthermore, many of them result in harsh treatment of an animal, particularly in driving the animal forward in the chute for locking its head in a head gate. More efficient and humane procedures are needed.

SUMMARY OF THE PRESENT INVENTION

The present invention provides a livestock chute for confining and controlling an animal for the various treatments thereof. The chute of the present invention provides a more gentle way of handling livestock and may be efficiently operated by one person.

The livestock chute of the present invention includes a pair of spaced apart side frames which are connected by support members to provide an elongated space into which the animal may be driven. A tailgate is provided near the rear end of the elongated space and is moveable from an open position, allowing the animal to enter the space, to a closed position preventing exit of the animal therefrom. A head gate assembly is supported near the front end of the elongated space and includes an expandable and contractible opening which, when expanded, allows the head of the animal to extend therethrough and, when contracted, surrounds the neck of the animal to prevent removal of its head therefrom.

The livestock chute of the present invention also provides a unique gate carriage mounted near the top of the side frames for longitudinal movement relative thereto and from which the head gate assembly is suspended between the side frames for movement between a terminal position near the front of the space and selected positions nearer the rear of the space. This unique feature takes advantage of the instinctive nature of the animal to remain at the rear of the chute and allows the head gate assembly to be brought back to the animal's head and neck so that the animal's head may be captured therein without having to prod or force the animal forward.

In a preferred embodiment, the livestock chute of the present invention includes a pair of side gates, one along each side frame, which is hingedly attached thereto nearer the rear end of the elongated space. Each of the side gates is moveable from a closed and latched position along side its respective frame to an open position outwardly of the side frame. This allows almost complete access to the side of any animal confined in the chute and allows exit of the animal from the elongated space if not prevented from doing so by the head gate assembly.

In preferred embodiments, the livestock chute of the present invention also includes a squeeze assembly supported at the side frames immediately forward of the tailgate. The squeeze assembly includes a pair of squeeze frames a lower member of which is pivotally mounted, allowing the squeeze frames to move between outwardly flared positions, in which the upper portions of the squeeze frame are further apart than the lower portions and inward positions in which the upper portions of the squeeze frame are as close or closer than the lower portions thereof for engagement of the squeeze assembly with the hip area of the animal confined in the elongated space. A force application mechanism is connected to the upper portions of each of the squeeze frames for simultaneously applying forces to move the squeeze frames into their inward positions. The width of each of the squeeze frames is slightly greater than the distance from just forward of the animal's hip to the rear of the animal's hip. Thus, instead of squeezing the entire length of the animal, as is done in livestock chutes of the prior art, the animal is immobilized by squeezing only the area between the ribs and the rear of the animal.

The livestock chute of the present invention thus provides a chute in which an animal may be confined and in which the head of the animal is immobilized in a unique head gate assembly which takes advantage of the instinctive nature of the animal to remain at the rear of the chute. The head gate assembly is moveable toward the animal in the rear of the chute and has an expandable opening which allows the head of the animal to extend therethrough as the gate assembly approaches the animal. The opening of the gate assembly is then contractible to surround the neck of the animal preventing removal of the animal's head therefrom.

The livestock chute of the present invention immobilizes the animal in a standing position, offering quick and easy access to the entire animal through side gates, a tailgate equipped with upper and lower access doors and hip gates provided by the squeeze assembly.

The livestock chute of the present invention also provides a much better way to immobilize the animal's head for inspection and treatment of horns, ears, eyes, nostrils, etc. This is accomplished by securing the hips with the squeeze assembly and reversing travel of the head gate, after capturing the head of the animal, to stretch the neck of the animal. This prevents the animal from moving its head from side to side or up and down, without any additional attachments, in a manner not heretofore available in the prior art.

Thus the livestock chute of the present invention has several unique features which allows the confining and controlling of an animal for various treatment by ranchers, farmers and veterinarians in a much safer, gentler, less traumatic and less stressful manner. Furthermore, it allows access to the entire animal for such treatments. It may be efficiently operated by one person. Many other objects and advantages of the invention will be apparent from reading the description which follow in conjunction with the accompanying drawings.

DESCRIPTION OF PREFERRED EMBODIMENT OF THE INVENTION

Figure 1:
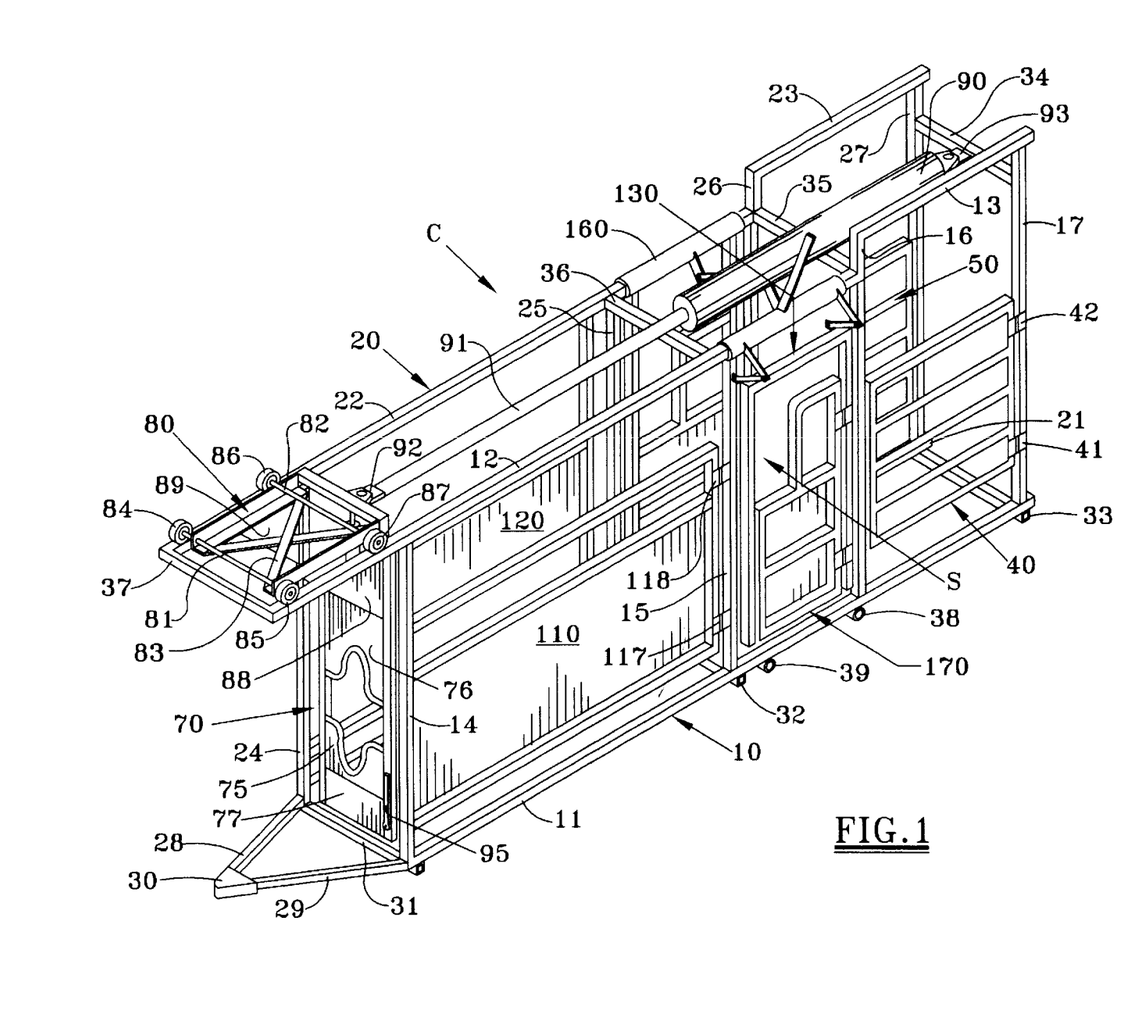
FIG. 1 is an isometric view of a livestock chute according to a preferred embodiment of the present invention.
Figure 2:
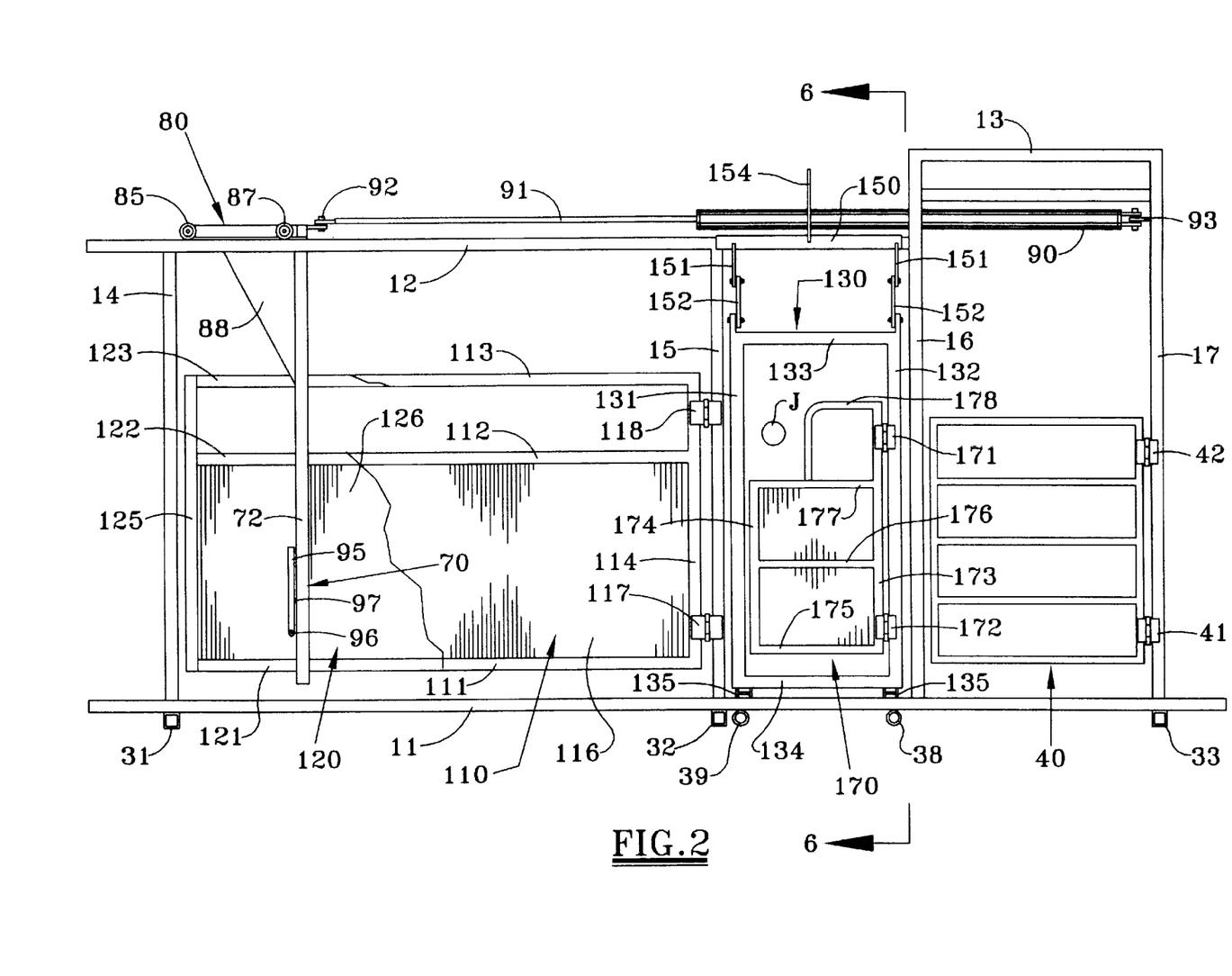
FIG. 2 is a side elevation view of the livestock chute of FIG. 1, according to a preferred embodiment thereof.

Referring first to FIGS. 1 and 2, there is shown a livestock chute C for confining and controlling animals, typically cattle, for various treatments thereof, e.g. medical treatments, branding, dehorning, palpation, surgery, etc. The chute may be described as having a pair of side frames 10 and 20 spaced apart from each other to provide an elongated space into which an animal may be driven. Each of the side frames may be defined by horizontal structural members 11, 12, 13 for one side, 21, 22, 23 for the other side and vertical structural members 14, 15, 16, 17 for one side and 24, 25, 26, 27 for the other side. The structural members of each of the side frames 10 and 20 may be connected by structural cross supports 31, 32, 33, 34, 35, 36, 37, etc. The structural members may be conveniently formed from square (or round) steel tubing welded together as shown.

If desired, structural members 28 and 29, forming a triangle with structural member 31, may be attached to the side frames 10, 20, coming together at a trailer hitch 30. The chute C may then be provided with wheels (not shown) and pulled from place to place such as a trailer. As shown in the drawings, the chute is simply resting on the ground and the ground provides the floor of the chute and supports animals driven thereinto. If desired, steel grating or the like may be provided as a floor therefor.

At the rear of the chute C is a pair of gates 40, 50. One of these gates 40 simply spans the space between vertical supports 16 and 17 and may be attached to vertical support 17 by hinges 41 and 42 allowing the gate to move from the position shown in FIGS. 1 and 2 to an outwardly opened position allowing a farmer, rancher or veterinarian access to the rear of the chute. The other gate 50 is hingedly attached to vertical structural member 26 of the opposite side frame, initially being parallel with gate 40 as seen in FIGS. 1 and 2. However, the gate 50 may swing inwardly toward positions shown in FIGS. 4 and 5, as a tailgate, to a closed position preventing exit of any animal which has entered the elongated space between the side frames 10 and 20. Incidently, gate 40 has been removed in FIG. 5 for a better view of the tailgate 50.

Figure 4:
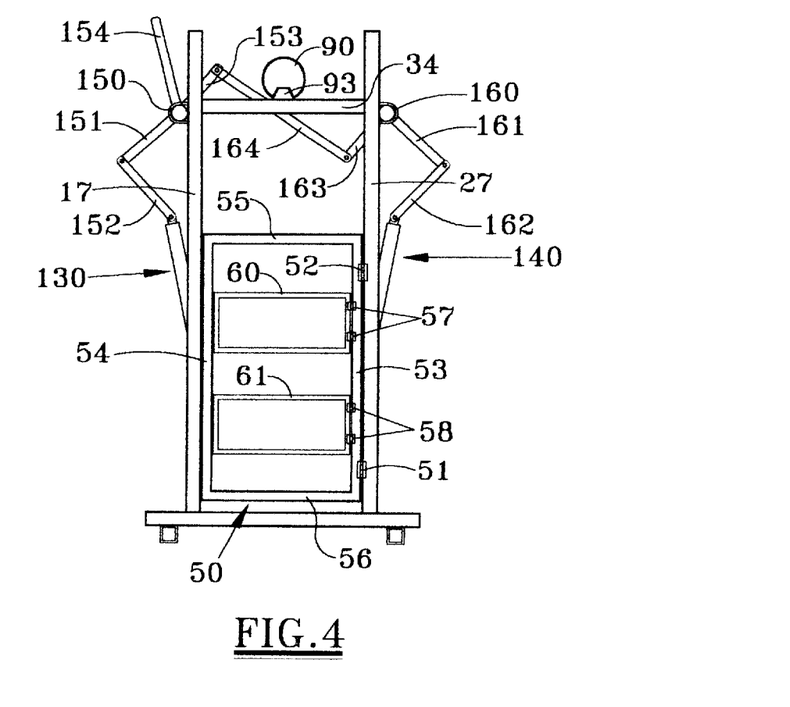
FIG. 4 is a rear view of the livestock chute of the present invention, according to a preferred embodiment thereof.
Figure 5:
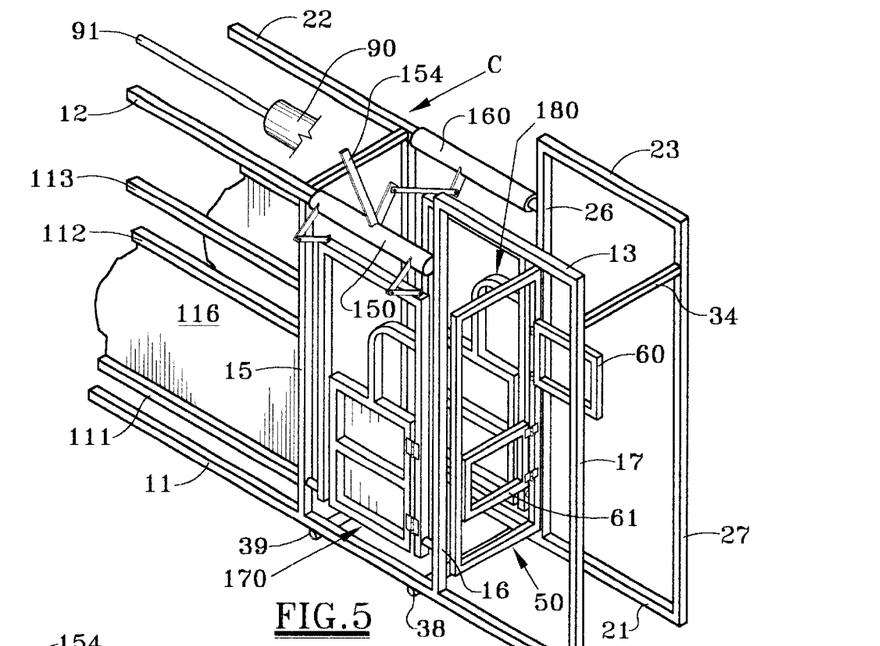
FIG. 5 is partial isometric view of the livestock chute of the present invention, as viewed from the rear thereof.

As previously indicated, the tailgate 50 is provided with hinges 51 and 52 and is framed by vertical members 53, 54 and horizontal members 55 and 56. Hingedly attached to the vertical member 53 by hinges 57 and 58 are a pair of doors, an upper door 60 and a lower door 61. These doors 60, 61 are independently moveable from closed positions, such as illustrated in FIG. 4 to open positions, such as illustrated for the upper door 60 in FIG. 5. Opening of the upper door 60 allows access to the upper rear of any animal within the chute. Opening of the lower door 61 allows access to the lower rear of the animal. At least one of the doors, 60, 61, should be closed to prevent the animal from backing out of the chute.

Figure 3:
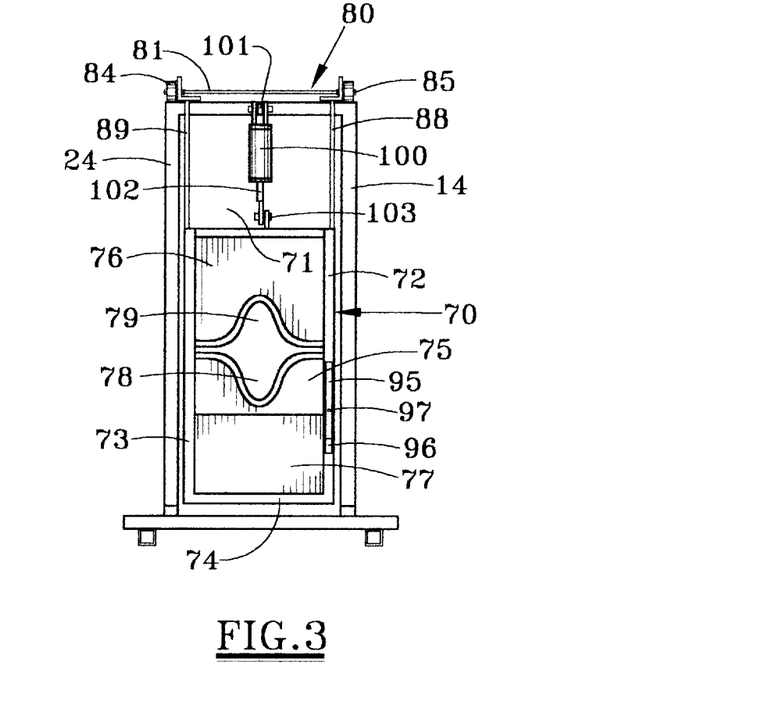
FIG. 3 is a front view of the livestock chute of the present invention, according to a preferred embodiment thereof.

Supported near the front end of the elongated space between side frames 10 and 20 is a head gate assembly 70 best seen in FIGS. 1 and 3. The head gate assembly 70 is suspended between the side frames 10 and 20 from a gate carriage 80 mounted at the top of the side frames 10 and 20 for longitudinal movement relative thereto. In the exemplary embodiment, the gate carriage 80 comprises a structural frame 83, axles 81 and 82 at opposite ends of which are steel rollers 84, 85, 86, 87. The rollers 85 and 87 engage horizontal support 12 and rollers 84, 86 engage horizontal support 22. Horizontal supports 12 and 22 may be considered rails for these rollers or may actually be provided with rails made from channel iron. The rollers and rails may be of any number of configurations. For present purposes it is necessary only that it be understood that the gate carriage 80, and consequently the gate assembly 70, may be moved from a terminal position at the furthermost front of the chute, as shown in FIG. 1, to selected positions nearer the rear of the chute, such as shown in FIG. 2. To move the gate carriage 80 and the gate assembly 70, a power source must be provided. In the exemplary embodiment, the power source is provided by a double acting piston and cylinder 90 which has a rod 91 attached at 92 to the gate carriage 80. The opposite end of the cylinder is fixed at 93 to the cross support 34. Movement of a piston (not shown) within the piston and cylinder assembly 90 reciprocates the rod 91 to move the gate carriage 80, and the gate assembly 70 depending therefrom, from the terminal position of FIG. 1 to the selected positions nearer to the rear of the chute such as the position shown in FIG. 2. This is probably the most unique feature of the chute of the present invention and the purpose of which will be more fully understood hereafter.

The hydraulic piston and cylinder assembly 90 will of course be supplied by a source of fluid under pressure such as a hydraulic pump (not shown) and the control therefor would be located at any suitable location on the chute. Other types of power could be utilized in moving the gate carriage 80 and gate assembly 70. For example, the piston and cylinder assembly 90 could be replaced by an electric winch which would be supplied from a power line or a battery. The gate carriage could also be powered by air, electric motors, internal combustion engines, etc. equipped with corresponding belts, chains, rack and pinion, ball screws, etc.

The head gate assembly 70 is suspended from gussets 88 and 89 and a connecting plate member 71 which are welded to the gate carriage 80. The gate assembly 70 may also comprise a frame of vertical members 72, 73 and horizontal member 74. At least the vertical members 72 and 73 may be made from channel steel having inwardly opening channels which provide vertical guides for moveable portions of a yoke, a lower yoke portion 75 and a upper yoke portion 76. A fixed plate member 77 is provided at the lower end of the gate assembly 70. The lower yoke portion 75 has a U-shaped recess 78 therein and the upper yoke portion 76 has an inverted U-shaped recess 79 therein. At least one of the upper and lower yoke portions 76, 75 is moveable away from the other to provide an open position which allows an animal's head to be extended therethrough. After the animal's head is extended therethrough, the moveable yoke portion may be moved toward the other yoke portion so that the U-shaped recesses 78 and 79 cooperate to surround the animal's neck in a closed position, preventing removal of the animal's head from the yoke. In the exemplary embodiment, and especially as seen in FIG. 3, a piston and cylinder assembly 100 may be fixedly attached at 101 and the piston rod 102 thereof attached at 103 to the upper yoke portion 76. This allows the upper yoke portion 76 to be moved by hydraulic power using the same source of hydraulic pressure which is utilized with the gate carriage piston and cylinder assembly 90. In the alternative, the upper yoke portion 76 could also be operated by an electric winch or other power devices.

The lower yoke portion 75 may also be selectively and vertically positional between lower and upper positions to accommodate animals of different heights. It could also be engaged by a release mechanism which might be manually disengaged to allow the lower yoke portion 75 to fall, by gravity, to its lowermost position (perhaps as low as the fixed plate 77) to free any animal's head which might otherwise be trapped therein.

One form of the mechanism for positioning and releasing the lower yoke portion 75 is shown in FIGS. 1, 2 and 3. A handle 95 is pivotally attached at 96 to the vertical member 72 and provided with a pin member 97 which projects through a hole in the vertical member for engagement with one of a series of holes (not shown) vertically aligned along one edge of the lower yoke portion 75. Engagement of the pin 97 with a selected one of the holes in the yoke portion 75 will position the lower yoke portion 75 where desired. In an emergency, the handle 95 can be pulled or pivoted from pivot 96, disengaging the pin 97 from the hole in yoke portion 75 and releasing the yoke portion to fall free of the animal's head.

Disposed along a substantial part of each of the side frames 10 and 20, in the exemplary embodiment, are side gates 110 and 120. The side gates may comprise horizontal members 111, 112 and 113 for gate 110 and 121, 122 and 123 for gate 120 and vertical members 114 for gate 110 and 125 for gate 120. Another vertical member for gate 110, corresponding with vertical member 125, is not shown because a portion of gate 110 is broken away. Another vertical member for gate 120, corresponding with vertical member 114 is not shown because it is hidden behind vertical member 114. Lower parts of these gates 110, 120 may be closed by sheet metal 116, 126. Each of the side gates 110, 120 is hingedly attached, such as shown by hinges 117 and 118 for gate 110 to a vertical support member 15 of the side frame 10 or 25 of the side frame 20 for gate 120. This allows the side gates 110, 120 to move from a closed and latched position along side a respective side frame, such as illustrated in FIGS. 1 and 2, to an open position outwardly of the side frames to allow access to the side of any animal in the elongated space between the side frames 10 and 20 or to allow exit of an animal from the elongated space if not prevented from doing so by the yoke of the head gate assembly 70.

Figure 6:
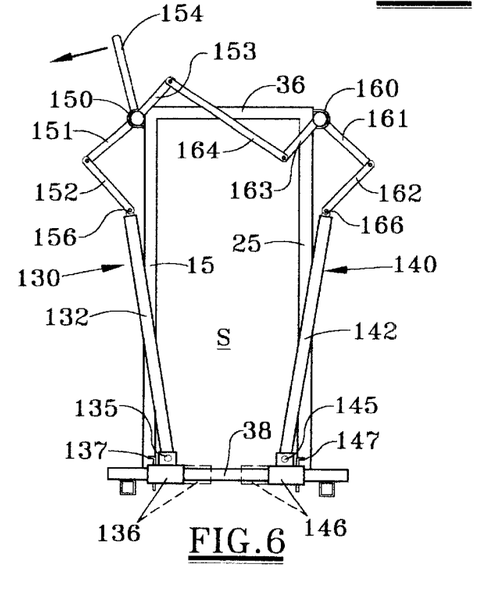
FIG. 6 is a sectional view of the livestock chute of the present invention taken along lines 6—6 of FIG. 2 and showing the squeeze assembly in a flared, non-squeezing position.
Figure 7:
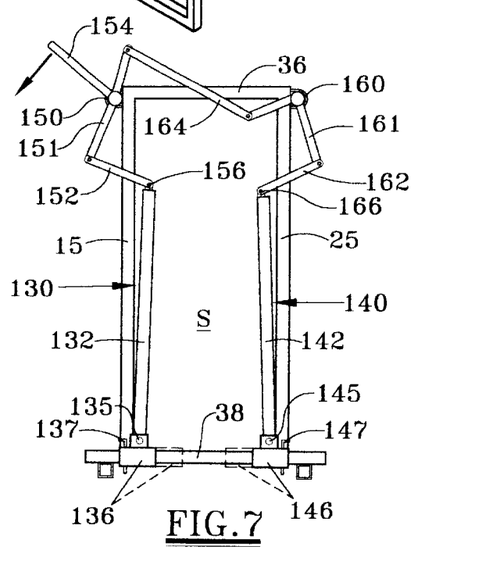
FIG. 7 is a sectional view, similar to FIG. 6, but showing the squeeze assembly in an inward or squeezed position.

Supported by the side frames 10 and 20 immediately forward of the gates 40 and 50, between the vertical supports 15, 16, 25 and 26 of the side frames is a squeeze assembly comprising a pair of squeeze frames 130, 140 one on each side of the chute. As best seen in FIG. 2 and 6 for the squeeze frame 130, the squeeze frame is defined by a pair of upwardly extending side members 131, 132 joined by shorter upper and lower horizontal members 133, 134. The lower edges of the squeeze frames 130, 140 are mounted on pivots 135, 145 which are fixed to tubular sleeves 136, 146 slidably mounted on smaller diameter tubular members 38, 39. Each of the sleeves 136, 146 is provided with vertically aligned holes and the tubular members 38, 39 with a series of vertical holes (not shown). The holes in the sleeves 136, 146 may be aligned with selected corresponding holes in the tubular members 38, 39 and pins 137, 147 engaged therewith to hold the sleeves 136, 146 (and consequently the lower edges of the side frames 130, 140) at selected spaced apart positions. The positions shown in FIGS. 6 and 7 are for a full sized animal. The pins 137, 147 may be removed and the sleeves 136, 146 moved closer to each other, as illustrated by dotted lines in FIGS. 6 and 7, for smaller animals, such as a calf. When so positioned, the pins 137, 147 may be reinserted to hold the sleeves 136, 146 in the dotted line positions.

The pivots 135 and 145, in any position of the sleeves 136, 146, allows the side frames 130, 140 to be moved between outwardly flared positions, such as illustrated in FIG. 4 and FIG. 6 in which the upper members of the squeeze frames 130, 140 are further apart than the lower members thereof, and inward positions, such as illustrated in FIG. 7, in which the upper members of the squeeze frames 130, 140 are as close or closer than the lower members allowing engagement of the squeeze assembly with the hip area of any animal confined in the elongated space S.

To provide for such movement, some means must be provided for placing inwardly directed forces to the upper portions of the squeeze frames 130, 140. In the exemplary embodiment this is provided by a pair of shaft members 150, 160 rotatably journaled between corresponding supports 15, 16 and 25, 26. Fixedly attached to the rotating shafts 150 and 160 are crank arms 151, 161 at the distal ends of which are pivotedly attached arms 152, 162. The distal ends of the arms 152 and 162 are in turn pivotedly attached at 156, 166 to an upper horizontal member 133 of the squeeze frame 130 and a corresponding horizontal member (hidden behind member 133) of squeeze frame 140. Also fixed to the shafts 150 and 160 are radial arms 153 and 163. Radial arm 153 extends in a generally upward direction and radial arm 163 in a generally downward direction. These arms 153, 163 are connected by link 164. Radially extending from the shaft 150 in a fixed relationship therewith is a lever 154. It will be appreciated that when a downwardly directed force is applied to the distal end of the lever 154, as indicated by the arrows in FIGS. 6 and 7, the shaft 150 will rotate in a counter-clockwise manner and the shaft 160 will rotate in a clockwise manner causing the arms 151, 152 and 161 and 162 to move toward the positions of FIG. 7 and consequently moving the squeeze frames 130, 140 from the outwardly flared positions of FIGS. 4 and 6 to the inwardly directed position of FIG. 7 so that the squeeze frames 130 and 140 will engage the hip area of any animal confined in the elongated space S. The squeeze assembly and the squeeze frames 130, 140 thereof are mounted in position so that the forward most vertical member 131 of squeeze frame 130 and a corresponding vertical member (hidden behind member 131) for squeeze frame 140 would be just forward of the hip of any animal confined in the elongated space S.

In the exemplary embodiment, each of the squeeze frames 130, 140 is provided with a hip gate which, as best seen with reference to the gate 170 of FIG. 2, is attached by hinges 171 and 172 along one edge thereof to a respective one of the squeeze frame side members 132 for movement from a closed and latched position as shown in FIG. 2, substantially spanning and occupying the lower half of a respective one of the side frames 130. The hip gate 170 can swing outwardly to an open position which provides access to the hindquarter of any animal confined in the space S. The gate 170 comprises vertical members 173, 174 and horizontal members 175, 176, 177. It may also be provided with an upper extension 178 which is so disposed as to engage an animal's hip area but to the rear of its hip joint. Thus, the hip joint would be in the general area indicated by the circle and reference "J" just forward of the extension 178 and just to the rear of the squeeze frame member 131.

In operation, the livestock chute C of the present invention would be placed adjacent a livestock pen or enclosure having an exit or opening generally framed by the vertical members 17, 27 of the side frames 10 and 20. Both gates 40 and 50 at the rear of the chute would be in the position of FIG. 1, leaving the elongated space therebetween open. The gate carriage 80 and gate assembly 70 would be at the terminal position of FIG. 1 in which the gate assembly would be near or at the furthermost forward position between the gate frames 10 and 20. The squeeze frames 130, 140 would be in the outwardly flared positions of FIGS. 4 and 6. An animal would then be driven into elongated space S and the gate 50 closed behind the animal such as shown in FIG. 4. Once the gate 50 is closed, the natural instinct of the animal is to back against the gate 50.

With the animal in the elongated space S, the upper yoke portion 76 of the gate assembly 70 would be moved apart from the other, or lower, yoke portion (if not already in such position) providing an expanded opening which would allow the animal's head to be extended therethrough. However, at this point, the animal does not normally extend its head through the opening.

With the animal captured within the enclosed space S, the piston and cylinder assembly 90 would be actuated causing the rod 91 to be retracted and moving the gate carriage 80 and gate assembly 70 toward the head of the animal, such as illustrated in FIG. 2. As the open or expanded yoke of the gate assembly 70 nears the animal's head the animal extends its head through the opening and movement of the gate assembly 70 is arrested just forward of the animal's shoulders. At this point, the yoke opening is contracted by lowering the upper yoke portion 76 so that the U-shaped recesses 78 and 79 cooperate to surround the animal's neck in a closed position, such as illustrated in FIG. 3, preventing removal of the animal's head from the yoke of the head gate assembly 70. The animal is then generally confined in the chute.

To further immobilize the animal for various treatments thereof, the squeeze assembly may then be brought into operation by applying a force to the end of the operating lever 154. The squeeze frames 130 and 140 move from their outwardly flared positions, as in FIGS. 4 and 6, to the inwardly directed position of FIG. 7 engaging the hip area of the animal and further immobilizing the animal in the chute. If desired, and once the head of the animal is captured, the head gate assembly may be slightly moved back toward the front of the chute so that the animal's neck would be stretched preventing the animal from throwing its head from side to side.

With the animal so captured, various examinations and treatments may proceed. Access to upper and lower portions of the rear of the animal may be gained through the tailgate 50 and the doors 60 and 61 thereof. Hip gates 170 and 180 may be opened to provide access to hindquarters of the animal. Side gates 110 and 120 may be opened to provide access to the entire side of the animal forward of its hip area.

When examination and treatment of the animal is completed, the squeeze frames 130, 140 of the squeeze assembly may be returned to the flared positions of FIGS. 4 and 6. The yoke opening of the head gate assembly 70 may be expanded or opened and the gate assembly 70 returned to its forwardmost terminal position freeing the animal's head. Then one of the side gates 110, 120 may be opened allowing the animal to exit the enclosed space S.

Thus, the present invention provides a livestock chute for capturing an animal for various examinations and treatments thereof which provides a much more gentle way of handling livestock and which may be efficiently operated by one person. Several unique features are provided. One of the most significant is the provision of a gate carriage and head gate assembly which is suspended between side frames for movement between a terminal position near the front of the space and selected positions near the rear of the space. This unique feature takes advantage of the instinctive nature of the animal to remain at the rear of the chute and allows the head gate assembly to be brought back over the animal's head and neck so that the whole animal may be held safe and secure without having to prod or force the animal forward.

The livestock chute of the present invention also provides a unique squeeze assembly which includes a pair of squeeze frames, one on each side of the chute, which are attached and provided with a force application mechanism for simultaneously applying forces to move the squeeze frames from outwardly flared positions to inward positions engaging the hip area of the animal in the enclosed space. The spacing of the squeeze frames may be adjusted for larger and smaller animals. Instead of squeezing the entire length of the animal, as with most livestock chutes of the prior art, the animal is immobilized by applying pressure in the natural depression between the animal's rib cage and hip bones.

The animal may be captured, confined and immobilized by a single person. Complete examination and treatment may proceed without fear of injury to the animal or the person performing such examinations and treatments. Several unique gate designs are provided in the present invention offering quick and easy access to the entire animal through parallel side gates, parallel hip gates and a two sectional tailgate.

A specific design for the livestock chute of the present invention has been described herein. Several variations have been mentioned. Many others may be made without departing from the spirit of the invention. Accordingly, it is intended that the scope of the invention should be limited only by the claims which follow.

What is claimed is:

1. A livestock chute for confining and controlling an animal for various treatments thereof, said chute comprising:

a pair of spaced apart side frames connected by support members to provide an elongated space into which said animal may be driven;

a tailgate near a rear end of said space which is moveable from an open position, allowing said animal to enter said space, to a closed position preventing exit of said animal from said space when entered;

a head gate assembly supported near a front end of said space and including an expandable and contractible opening which, when expanded, allows the head of said animal to extend therethrough and, when contracted, surrounds the neck of said animal to prevent removal of said animal's head therefrom; and a gate carriage mounted near said front end of said space and the top of said side frames for longitudinal movement relative thereto and from which said head gate assembly is suspended between said side frames for movement between a terminal position near the front of said space and selected positions nearer the rear of said space, wherein movement of said gate carriage from said terminal position to said selected positions nearer the rear of said space allows said head gate assembly to be brought back over said animal's head and neck such that said opening can contract to prevent removal of said animal's head therefrom.

2. A livestock chute as set forth in claim 1 in which said gate carriage engages parallel rails at the top of said side frames and in which said gate carriage is connected to power means by which said gate carriage and said gate assembly are moved along said rails between said terminal position and said selected positions.

3. A livestock chute as set forth in claim 1 in which said expandable and contractible opening is defined by a yoke of mutually cooperating first and second portions, at least one of said yoke portions being moveable away from the other yoke portion to provide said expanded opening which allows said animal's head to be extended through said opening, said one of said yoke portions then being moveable toward said other yoke portion so that said first and second yoke portions cooperate to surround said animal's neck with said contracted opening, preventing removal of said animal's head from said yoke.

4. A livestock chute as set forth in claim 3 in which said one yoke portion is connected to power means by which said one yoke portion may be moved to effect said expanded and contracted opening of said yoke.

5. A livestock chute as set forth in claim 1 including a side gate disposed along a substantial part of at least one of said side frames and hingedly attached thereto nearer the rear end of said space for movement from a closed and latched position along said one side frame to an open position outwardly of said side frame allowing access to the side of any animal in said elongated space and allowing exit of said animal from said elongated space if not prevented from doing so by said head gate assembly.

6. A livestock chute as set forth in claim 1 in which said tailgate is provided with upper and lower doors attached along a vertical edge of said tailgate and independently moveable from closed positions to open positions, said upper door allowing access to the upper rear of said animal, said lower door allowing access to the lower rear of said animal.

7. A livestock chute as set forth in claim 1 including a squeeze assembly supported by said side frames immediately forward of said tailgate, said squeeze assembly comprising a pair of squeeze frames each of which comprise horizontal lower and upper members joined by substantially parallel side members, the said lower member of each of said squeeze frames being mounted on a pivot allowing said squeeze frames to move between outwardly flared positions, in which said upper members of said squeeze frames are further apart than said lower members, and inward positions in which said upper members of said squeeze frames are as close or closer than said lower members for engagement of said squeeze assembly with the hip area of said animal to be confined in said elongated space.

8. A livestock chute as set forth in claim 7 in which said squeeze assembly comprises force means connecting said upper members of each of said squeeze frames and by which inwardly directed forces may be simultaneously applied to each of said squeeze frames for moving said squeeze frames to said inward positions.

9. A livestock chute as set forth in claim 8 in which at least one of said squeeze frames is provided with a hip gate hingedly attached along one edge thereof to one of said parallel squeeze frame side members for movement from a closed and latched position, spanning the space between said parallel side members, and an outwardly open position in which said space provides access to a hindquarter of said animal.

10. A livestock chute as set forth in claim 7 in which one or both of said side frames is provided with a side gate hingedly attached thereto just forward of said squeeze assembly for movement from a closed and latched position along a respective side frame to an open position outwardly of said side frame allowing access to the side of any animal in said elongated space and allowing exit of said animal from said elongated space if not prevented from doing so by said head gate assembly.

11. A livestock chute for confining and controlling an animal for various treatments thereof, said chute comprising:

a pair of spaced apart side frames connected by upper and lower support members to provide an elongated space into which said animal may be driven;

a tailgate near a rear end of said elongated space which is moveable from an open position, allowing said animal to enter said space, to a closed position preventing exit of said animal from said space when entered;

a head gate assembly supported near a front end of said space and including a moveable yoke which, in an open position, allows the head of said animal to extend therethrough and, in a closed position, surrounds the neck of said animal to prevent removal of said animal's head from said yoke; and a gate carriage mounted near said front end of said space and at the top of said side frames for longitudinal movement relative thereto and from which said gate assembly is suspended between said side frames for movement between a terminal position at the furthermost front of said space and selected positions nearer the rear of said space, wherein movement of said gate carriage from said terminal position to said selected positions nearer the rear of said space allows said head gate assembly to be brought back over said animal's head and neck such that said moveable yoke can surround the neck of said animal to prevent removal of said animal's head therefrom.

12. A livestock chute as set forth in claim 11 in which said gate carriage engages parallel rails at the top of said side frames and in which said gate carriage is connected to power means by which said gate carriage and said gate assembly are moved between said terminal position and said selected positions.

13. A livestock chute as set forth in claim 11 in which said yoke comprises a lower yoke portion having a U-shaped recess and an upper yoke portion having an inverted U-shaped recess, at least one of said upper and lower yoke portions being vertically moveable away from the other yoke portion to provide said open position which allows said animal's head to be extended therethrough, said one of said upper and lower yoke portions then being vertically moveable toward said other yoke portion so that said U-shaped recess and said inverted U-shaped recess cooperate to surround said animal's neck in said closed position, preventing removal of said animal's head from said yoke.

14. A livestock chute as set forth in claim 13 in which said upper yoke portion is connected to power means by which said upper yoke portion may be moved upwardly to effect said open position of said yoke and downwardly to effect said closed position of said yoke.

15. A livestock chute as set forth in claim 14 in which said lower yoke portion is selectively and vertically positional between lower and upper positions to accommodate animals of different heights.

16. A livestock chute as set forth in claim 15 in which at least one hole in said lower yoke portion is engaged by a pin which may be manually disengaged from said hole to allow said lower yoke portion to fall, by gravity, to a lower position for freeing any animal's head which is trapped therein.

17. A livestock chute as set forth in claim 11 including a side gate disposed along a substantial part of at least one of said side frames and hingedly attached thereto nearer the rear end of said space for movement from a closed and latched position along said one side frame to an open position outwardly of said side frame allowing access to the side of any animal in said elongated space and allowing exit of said animal from said elongated space if not prevented from doing so by said yoke.

18. A livestock chute as set forth in claim 17 including another side gate disposed along a substantial part of the other of said side frames and hingedly attached thereto nearer the rear end of said space for movement from a closed position along said other side frame to an open position outwardly of said other side frame.

19. A livestock chute as set forth in claim 11 in which said tailgate is provided with upper and lower doors attached along a vertical edge of said tailgate and independently moveable from closed positions to open positions, said upper door allowing access to the upper portion of the rear of said animal, said lower door allowing access to the lower portion of the rear of said animal.

20. A livestock chute as set forth in claim 11 including a squeeze assembly supported by said side frames immediately forward of said tailgate, said squeeze assembly comprising a pair of squeeze frames each of which comprises horizontal lower and upper members joined by substantially parallel side members, the said lower member of each of said squeeze frames being mounted on a pivot allowing said squeeze frames to move between outwardly flared positions, in which said upper members of said squeeze frames are further apart than said lower members, and inward positions in which said upper members of said squeeze frames are as close or closer than said lower members for engagement of said squeeze assembly with the hip area of said animal to be confined in said elongated space.

21. A livestock chute as set forth in claim 20 in which said squeeze assembly comprises force means connecting said upper members of each of said squeeze frames and by which inwardly directed forces may be simultaneously applied to each of said squeeze frames for moving said squeeze frames to said inward positions.

22. A livestock chute as set forth in claim 21 in which the width of each of said squeeze frames is less than half the length of said elongated space.

23. A livestock chute as set forth in claim 21 in which the width of each of said squeeze frames is slightly greater than the distance from just forward of said animal's hip to the rear of said animal's hip.

24. A livestock chute as set forth in claim 20 in which at least one of said squeeze frames is provided with a hip gate hingedly attached along one edge thereof to one of said parallel squeeze frame side members for movement from a closed and latched position, spanning the space between said parallel side members, to an outwardly open position in which said space provides access to a hindquarter of said animal.

25. A livestock chute as set forth in claim 24 in which said hip gate, when closed, substantially occupies the lower half of said one of said squeeze frames, leaving the upper half of said one of said squeeze frames substantially unoccupied.

26. A livestock chute as set forth in claim 25 in which said hip gate is provided at the top thereof with an upper extension which substantially occupies the lower and rearmost quarter of said substantially unoccupied upper half of said squeeze frame.

27. A livestock chute for confining and controlling an animal for various treatments thereof, said chute comprising:

a pair of spaced apart side frames connected by support members to provide an elongated space into which said animal may be driven;

a tailgate disposed near a rear end of said space which is moveable from an open position, allowing said animal to enter said space, to a closed position preventing exit of said animal from said space when entered;

a head gate assembly supported near a front end of said space and including a moveable yoke which, in an open position, allows the head of said animal to extend therethrough, and in a closed position, surrounds the neck of said animal to prevent removal of said animal's head from said yoke; and a squeeze assembly supported by said side frames immediately forward of said tailgate, said squeeze assembly comprising a pair of substantially rectangular squeeze frames, the outer perimeter of each squeeze frame defined by a pair of upwardly extending side members, the forward most of which is positioned just formed of the hip of said animal, joined by shorter upper and lower horizontal members, said lower member of each of said squeeze frames being mounted on a pivot allowing said squeeze frames to move between outwardly flared positions, in which said upper members of said squeeze frames are further apart than said lower members, and inward positions in which said upper members of said squeeze frames are as close or closer than said lower members for engagement of said squeeze assembly with the hip area of said animal to be confined in said elongated space.

28. A livestock chute as set forth in claim 27 in which said squeeze assembly comprises force means connecting said upper members of each of said squeeze frames and by which inwardly directed forces may be simultaneously applied to each of said squeeze frames for moving said squeeze frames from said outwardly flared positions to said inward positions.

29. A livestock chute as set forth in claim 28 in which one or both of said squeeze frames is provided with a hip gate hingedly attached along one edge thereof to a respective one of said squeeze frame side members for movement from a closed and latched position, substantially spanning and occupying the lower half of a respective one of said side frames, to an outwardly open position providing access to a hindquarter of said animal.

30. A livestock chute as set forth in claim 29 in which said hip gate is provided at the top thereof with an upper extension which is disposed to engage said animal's hip area but to the rear of its hip joint.

31. A livestock chute as set forth in claim 27 in which one or both of said side frames is provided with a side gate hingedly attached thereto just forward of said squeeze assembly for movement from a closed and latched position along a respective side frame to an open position outwardly of said side frame allowing access to the side of any animal in said elongated space and allowing exit of said animal from said elongated space if not prevented from doing so by said yoke.

32. A livestock chute as set forth in claim 27 including a gate carriage supported by said side frames and said connected support members and from which said head gate assembly is suspended, said gate carriage and said head gate assembly being moveable between a terminal position at the front of said elongated space to selected positions nearer said rear of said elongated space so that when said animal's head extends through said yoke, said animal's body will be closely confined between said gate assembly and said tailgate.

33. A livestock chute as set forth in claim 32 in which said gate carriage is attached to power means by which said gate carriage and said gate assembly may be moved between said terminal position and said selected positions.

34. A livestock chute as set forth in claim 27 in which said tailgate is provided with upper and lower doors hingedly attached along a vertical edge of said tailgate and independently moveable from closed positions to open positions, said upper door allowing access to the upper rear of said animal, said lower door allowing access to the lower rear of said animal.

35. A livestock chute as set forth in claim 27 in which said yoke comprises a lower yoke portion having a substantially U-shaped recess and an upper yoke portion having a substantially inverted U-shaped recess, at least one of said lower and upper yoke portions being vertically moveable away from the other yoke portion to effect said open position which allows said animal's head to be extended therethrough, said one of said lower and upper yoke portions then being moveable toward said other yoke portion so that said U-shaped recess and said inverted U-shaped recess cooperate to surround said animal's neck in said closed position.

36. A livestock chute as set forth in claim 35 in which said one of said lower and upper yoke portions is connected to a power device by which it is moved between said open and closed positions.

37. A livestock chute as set forth in claim 36 in which said upper yoke portion is connected to said power device for said vertical movement away from and toward said lower yoke portion.

38. A livestock chute as set forth in claim 37 in which said lower yoke portion is selectively and vertically positional between lower and upper positions to accommodate animals of differing heights.

39. A livestock chute as set forth in claim 38 in which said lower yoke portion is engageable by a release mechanism which may be disengaged to allow said lower yoke portion to fall, by gravity, to a lowermost position for freeing any animal's head which may be confined by said yoke.

40. A livestock chute as set forth in claim 27 in which said pivot for each of said squeeze frames is attached to a tubular sleeve, said tubular sleeves being slidably mounted on smaller tubular members allowing said tubular sleeves to be positioned at selectively spaced apart positions to accommodate animals of different sizes.

41. A livestock chute as set forth in claim 40 in which said tubular sleeves are provided with holes and said smaller tubular members are provided with a series of holes, the holes of said tubular sleeves and corresponding holes of said smaller tubular members being engageable by a pin member to fix said tubular sleeves in a selected spaced apart position.

* * * * *